G. DRUMMOND.
OIL GAS GENERATOR AND BURNER.
APPLICATION FILED JUNE 1, 1909.
958,861.
Patented May 24, 1910.
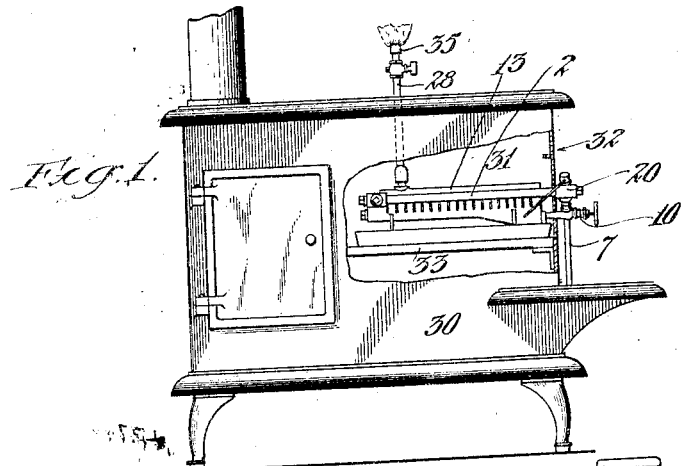
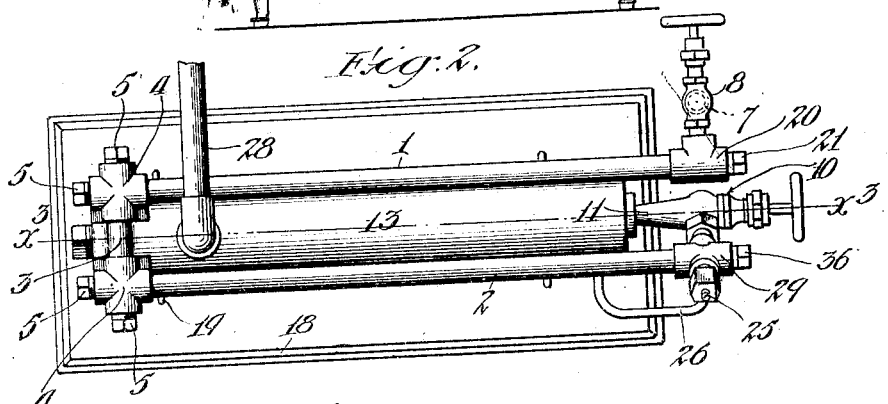
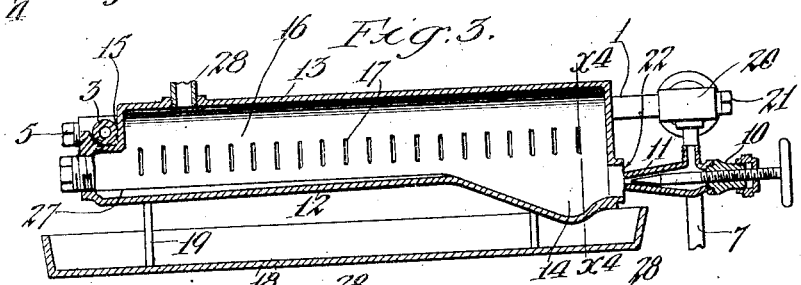
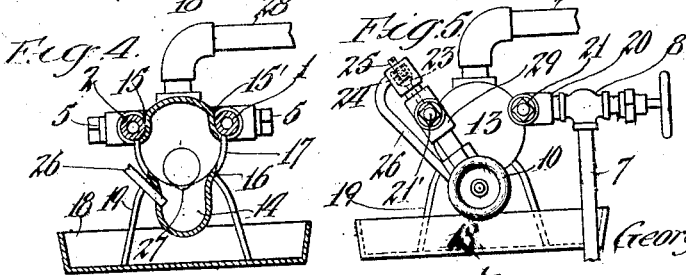
Inventor:
George Drummond

UNITED STATES PATENT OFFICE.

GEORGE DRUMMOND, OF LOS ANGELES, CALIFORNIA.

OIL-GAS GENERATOR AND BURNER.

958,861.  Specification of Letters Patent.  Patented May 24, 1910.

Application filed June 1, 1909.  Serial No. 499,587.

*To all whom it may concern:*

Be it known that I, GEORGE DRUMMOND, citizen of the United States, residing at Los Angeles, in the county of Los Angeles and State of California, have invented a new and useful Oil-Gas Generator and Burner, of which the following is a specification.

This invention relates to the class of oil burning appliances wherein a retort is provided for generating the oil into gas, the gas being produced under pressure and being mixed with air in a mixing chamber preliminary to its combustion.

The main object of the present invention is to provide a burner of this character of simple and compact construction and efficient and economical in operation.

A further object of the invention is to provide a burner in which the several parts can be conveniently cleaned out when required.

Other objects and advantages of the invention will appear hereinafter.

Referring to the drawings: Figure 1 is a side elevation, partly broken away, of a stove provided with the oil-gas generator and burner constituting the present invention. Fig. 2 is a plan of the device. Fig. 3 is a longitudinal section on line $a^3$—$a^3$ in Fig. 2. Fig. 4 is a transverse section on line $a^4$—$a^4$ in Fig. 3. Fig. 5 is a front end elevation of the burner.

The apparatus comprises a retort and a combined mixing and burner chamber connected thereto. The retort consists of tubular or pipe members connected to form a U-shaped tubular structure, comprising two horizontal parallel arms or members 1, 2, and a cross tube 3 connecting said members at one end. Cross tube 3 is connected to tubular members 1, 2 by four-way fittings 4 having screw plugs 5. The oil inlet pipe 7 is connected to the inlet end of the tube 1 and a valve 8 is provided for this oil supply connection. The delivery end of the other tubular member or arm 2 is connected to the gas valve 10 whose outlet 11 is formed as a nozzle extending within the mixing chamber. The connections of the inlet and outlet tubes are made by tee 20 provided with screw plug 21, and by four-way fitting 29 having a screw plug 36.

The mixing chamber consists of a tubular body 13 extending longitudinally between the arms or members 1, 2 and provided at its rear end with a downward extension 12, into which the gas nozzle 11 opens, there being an air inlet opening 22 around the nozzle. Directly in front of the inlet of the mixing chamber this downward extension is provided with a depression or cup portion 14. The tubular body of the mixing chamber is closed at each end and at the forward end it is notched as at 15 to receive the cross tube 3 of the retort. The two arms of the retort preferably hug or closely embrace the body 13 of the mixing and burner chamber, said body being preferably formed of circular shape with the retort arms resting against the upper inclined walls thereof and on projecting portions or shoulders 15' at the respective sides of said body. The lower inclined walls 16 of the mixing and burner chamber are preferably perforated by transverse slits or slots 17 beneath the retort members 1, 2, so that the gas may issue laterally therethrough. The mixing chamber may rest on a suitable drip pan or other suitable support 18 by means of legs 19 extending from the forward portion of the body. The front portion of the retort has a groove or channel 27 in its floor, said channel inclining downwardly toward the front.

Means are provided for relieving any condition of excess pressure in the retort, said means consisting of a relief valve or safety valve 23 controlled by a spring 24 having an adjusting screw 25, the outlet of said relief valve communicating by a pipe 26 with the enlargement 12 of the mixing chamber, so that when any condition of excess pressure is developed in the generator or retort the excess of gas will pass through this relief valve and pipe 26 to the mixing chamber and thence to the burner outlets where it will be consumed.

I have found it practicable with such a burner to generate a considerably greater quantity of combustible gas than is required for the operation of the burner. In order to utilize this excess gas for other purposes, a pipe or conduit 28 may be connected to the top of the mixing chamber 13, said pipe leading to any location where a burner is desired.

The burner may be applied to an ordinary stove as shown in Fig. 1, where 30 indicates a stove, 31 the fire pot thereof, and 32 the front. The drip pan 18 is placed on the usual grate 33 of the stove, so as to act as a closure for the bottom of the fire pot and cause the air draft through the stove to pass through the air inlet 22 around the gas inlet 11. The supplementary gas delivery pipe 28 may extend to the outside of the stove and then to any suitable burner or burners indicated at 35.

The operation is as follows: When the oil is first turned on it fills the retort and a portion flows out through the gas nozzle 11 into the cup or depression 14 and owing to the velocity of the oil, a portion thereof will be projected onto the farther portion of the floor of the mixing chamber and will accumulate in the groove 27, which, being forwardly inclined, will convey the oil, in part, to the forward end of the mixing chamber. The oil being then lighted by the match applied through the air inlet it burns within the mixing chamber and gradually warms the same and the retort, so that eventually the fuel will be discharged from the nozzle 11 in the form of gas at a high velocity, the flame within the mixing chamber being then extinguished. The velocity of this gas, together with the natural draft from the stove, causes air to be drawn in through the air inlet 22 and said air is mixed with the gas within the chamber 13 and the mixture issues through the slots 17 of the chamber 13 and burns in transverse flames which extend directly under the members 1, 2 of the retort, so that the retort is subjected to the direct heat of the flame. The retort being supported by the ledges or shoulders 15 of the body 13, it is not liable to become warped or to sag by reason of the intense heat applied thereto. The screw plugs 5, 21, 36 are in line with the longitudinal and cross tubes 1, 2, 3, so that by removing these plugs, the tubes are exposed from end to end, for inspection or cleaning, and can be cleaned by pushing a bar therethrough.

What I claim is:

1. An oil-gas generator and burner comprising a retort formed with two horizontal tubular members, a cross tube connecting said members at one end, an oil inlet connection to the other end of one of said members, an outlet connection to the corresponding end of the other of said members, and a mixing chamber connected to said outlet connection and extending longitudinally between said members and having outlet slots at each side thereof beneath the retort members, said mixing chamber being formed as a tubular member having a downward enlargement at one end, and having an air inlet opening in said enlargement, the outlet connection from the retort opening into said inlet.

2. An oil-gas generator and burner comprising a tubular mixing chamber formed with a projecting portion along each side and a retort formed of two longitudinal members extending alongside the mixing chamber and resting on said projecting portion at each side, and a cross tube connecting said members.

3. An oil-gas generator and burner comprising a retort formed with two longitudinal tubular members, a cross tube connecting said members at one end, an oil inlet connection to the other end of one of said members, an outlet connection to the corresponding end of the other of said members, a mixing chamber connected to said outlet connection and extending longitudinally between said members and having outlet slots at each side thereof beneath the retort members, said mixing chamber being grooved at each side, and the longitudinal tubular members of the retort resting in said grooves of the mixing chamber.

4. An oil-gas generator and burner comprising a retort, an oil supply connection to said retort, an outlet connection from the retort provided with a manually operated valve, a mixing chamber communicating with the outlet connection to the retort and having an air inlet and provided with outlet means, and a connection extending from the retort to the mixing chamber and provided with a relief valve opening under definite pressure.

5. In an oil-gas generator and burner, a retort comprising two longitudinal members, a cross tube connecting said members at one end, four-way fittings at the junction of the cross tube with each longitudinal member, removable plugs in said four-way fittings in line with the cross tube and with the longitudinal members, a tee-fitting at the other end of one of said tubular members, a removable plug in said tee-fitting in line with said longitudinal member, a valved inlet connection communicating with the other arm of the tee-fitting, a four-way fitting at the corresponding end of the other tubular member, a removable plug therein in line with the said other tubular member, a relief valve communicating with another arm of the last named four-way fitting, an outlet pipe from said relief valve, a mixing chamber communicating with said outlet pipe and having outlet means, and air inlet means, a valved outlet connected with the other opening of the four-way fitting, and a nozzle connected with said outlet means and extending in position to direct the gas therefrom into the air inlet of the mixing chamber.

In testimony whereof, I have hereunto set my hand at Los Angeles, California, this 26th day of May 1909.

GEORGE DRUMMOND.

In presence of—
P. H. SHELTON,
FRANK L. A. GRAHAM.